US006247089B1

United States Patent
Kuo et al.

(10) Patent No.: US 6,247,089 B1
(45) Date of Patent: Jun. 12, 2001

(54) EFFICIENT DATA LOADING SCHEME TO MINIMIZE PCI BUS ARBITRATIONS DELAYS AND WAIT STATES

(75) Inventors: Jerry Chun-Jen Kuo; John Chiang, both of San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/154,076

(22) Filed: Sep. 16, 1998

(51) Int. Cl.[7] .................................................. G06F 13/00
(52) U.S. Cl. ............................................................ 710/129
(58) Field of Search ............................ 709/250; 711/169, 711/167, 157, 156; 710/127, 129, 130, 100

(56) References Cited

U.S. PATENT DOCUMENTS

| | | | | |
|---|---|---|---|---|
| 5,727,149 | * | 3/1998 | Hirata et al. ........................ | 709/250 |
| 5,857,075 | * | 1/1999 | Chung ................................. | 709/223 |
| 6,061,768 | * | 5/2000 | Kuo et al. ........................... | 711/156 |
| 6,145,016 | * | 11/2000 | Lai et al. ............................. | 710/4 |

* cited by examiner

Primary Examiner—Glenn A. Auve

(57) ABSTRACT

A network interface has a static random access memory (SRAM) that outputs ordered data to a target by using a first and second holding register, and an output holding register. The SRAM supplies a data set to the first holding register which supplies the first data set to the second holding register. The SRAM also replenishes the first holding register with a second data set. A multiplexer selectively supplies the data set stored in one of the two holding registers to the output holding register which supplies that data set to a bus connected to the target. A bus interface unit state machine supplies a select signal to the multiplexer to control the selection between the first and second holding registers. The state machine generates the select signal based on a bus access controller detecting a target ready signal generated by the target indicating the target's readiness to receive a data set. The select signal enables the multiplexer to supply the next ordered data set to the output holding register. If the target ready signal is asserted too frequently for the first holding register to replenish the second holding register, then the state machine generates a select signal that controls the multiplexer to supply the data set stored within the first holding register to the output holding register. If the target ready signal is asserted relatively infrequently and the first holding register has sufficient time to replenish the second holding register, then the state machine generates a select signal that controls the multiplexer to supply the data set stored within the second holding register to the output holding register.

17 Claims, 6 Drawing Sheets

EFFICIENT DATA LOADING SCHEME TO MINIMIZE PCI BUS ARBITRATIONS DELAYS AND WAIT STATES

BACKGROUND OF THE INVENTION

1. Technical Field

The present invention relates to network interfaces, and more specifically to arrangements in network interfaces for transferring data using Direct Memory Access (DMA) techniques via a host bus between a host memory and the network interface.

2. Description of Related Art

Network interfaces connecting a host computer to a network such as an Ethernet-type or IEEE 802.3 network, typically utilize a host bus to transfer information between a host memory and the network interface. Two types of bus transfers may be used, namely master mode and slave mode. In master mode, a transaction or transfer of information over the bus is initiated by a master, which arbitrates for use of the bus along with other masters requesting use of the bus.

One example of a host bus is the peripheral component interconnect (PCI) local bus. A single transaction or transfer of information over a PCI bus comprises an address phase followed by one or more contiguous data phases. In conducting transactions, the PCI bus makes use of a centralized, synchronous arbitration scheme in which each PCI master arbitrates for each transaction using a unique request and grant signal. These signal lines are attached to a central arbiter and a request-grant handshake is used to grant the master access to the bus. A common sequence for a request-grant handshake is begun when the master asserts a request signal to request use of the bus. A host CPU will respond with a grant signal, followed by assertion of a frame signal that in combination identify to the network interface when the bus is available for data transfers.

The period of time between the assertion of the request signal and the grant signal is known as arbitration latency. The arbitration latency may delay transfer of data by the network interface on the host bus, and is based on the arbitration algorithm used by the host CPU, the relative priority compared to other devices accessing the bus, and system utilization. Since the PCI bus specification does not dictate a particular arbitration algorithm, arbitration latency is variable. Prior art approaches to arbitration simply wait until the frame signal is asserted before transferring data to a target via the host bus. Since the arbitration latency is a function of the arbitration algorithm, this approach causes unnecessary arbitration delays which causes additional wait states to be experienced during the transfer.

SUMMARY OF THE INVENTION

There is a need for an arrangement that minimizes arbitration delays and wait states during data transfers by a network interface on a host bus.

There is also a need for an arrangement that provides the data to be transferred, between a network interface and a host memory via the host bus, by loading the data into holding registers in the network interface prior to the readiness of the host memory to receive data based on the network interface detecting signals normally asserted on the network in arbitrating for use of the network. There is also a need for an arrangement that provides for data loaded in holding registers to be output onto the host bus, and new data to be loaded in the holding registers for later output, based on a host memory ready signal provided by the host memory indicating a readiness of the host memory to receive data transferred via the host bus, to minimize wait states during host memory state transitions.

These and other needs are attained by the present invention, where fiame data is stored in network interface holding registers in response to a memory advance signal generated by a bus access controller, and where the frame data is selectively output onto the host bus based on the ability of the host memory to receive the data. The selective output of data is based on a successful transfer of data on the host bus during a preceding clock cycle.

According to one aspect of the present invention, a method in a network interface having a bus access controller, for transferring data between a target via a host bus, comprises generating a memory advance signal based on at least one of a transfer request signal generated in the network interface by a bus access controller, a grant signal on the host bus following the transfer request signal, and a ready signal on the host bus indicating a ready condition by the target to receive data. The method further includes first storing a first data set, supplied from a buffer memory, in a first holding register in response to the assertion of the memory advance signal during a first host bus clock cycle, second storing the first data set stored in the first holding register into a second holding register in response to assertion of the memory advance signal during a second host bus clock cycle following the first host bus clock cycle, third storing a second data set in the first holding register in response to assertion of the memory advance signal during the second host bus clock cycle, and selectively supplying one of the first and second data sets to an output holding register for output on the host bus based on detection the memory advance signal. Use of the advance signal to store data sets in the first holding register enables frame data to be loaded into the holding register, for output onto the host bus, before receiving a target ready signal. Moreover, the selective supply from the first or second holding register enables data from the network interface to be transferred the next clock cycle after receiving the target ready signal, without the necessity of a wait clock cycle to load the data from buffer memory for output onto the host bus.

Another aspect of the present invention provides a network interface for transferring received data via a host bus to a target, comprising a memory configured for storing a plurality of data sets, a bus access controller for generating an advance signal based on at least one of a transfer request signal generated by the network interface, a grant signal on the host bus following the transfer request signal, and a ready signal on the host bus indicating a ready condition by the target to receive data, a first holding register for storing a first data set transferred from the memory in response to assertion of the advance signal during a first clock cycle, a second holding register for storing the first data set from the first register in response to assertion of the advance signal during a second clock cycle following the first clock cycle, the first register storing a second data set output from the memory in response to assertion of the advance signal during the second clock cycle, and an output holding register for selectively storing one of the first and second data sets for output on the host bus based on detection of the memory advance signal. The bus access controller selectively outputs the data set from the first or second holding register to the output holding register for output to the host bus to accommodate variances in the frequency of target ready signals received from the target and detected by the bus access controller. Hence, the output holding register is able to output data onto the host bus with zero wait states following the grant signal, despite any arbitration latency that may be encountered on the host bus.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface in a network such as an Ethernet (IEEE 802.3) network. A description will first be given of the network interface architecture and the memory management architecture, followed by the arrangement for supplying frame data between a memory buffer and a target via a host bus without the necessity of wait states according to an embodiment of the present invention.

Network Interface Architecture

Figures 1, 1A:
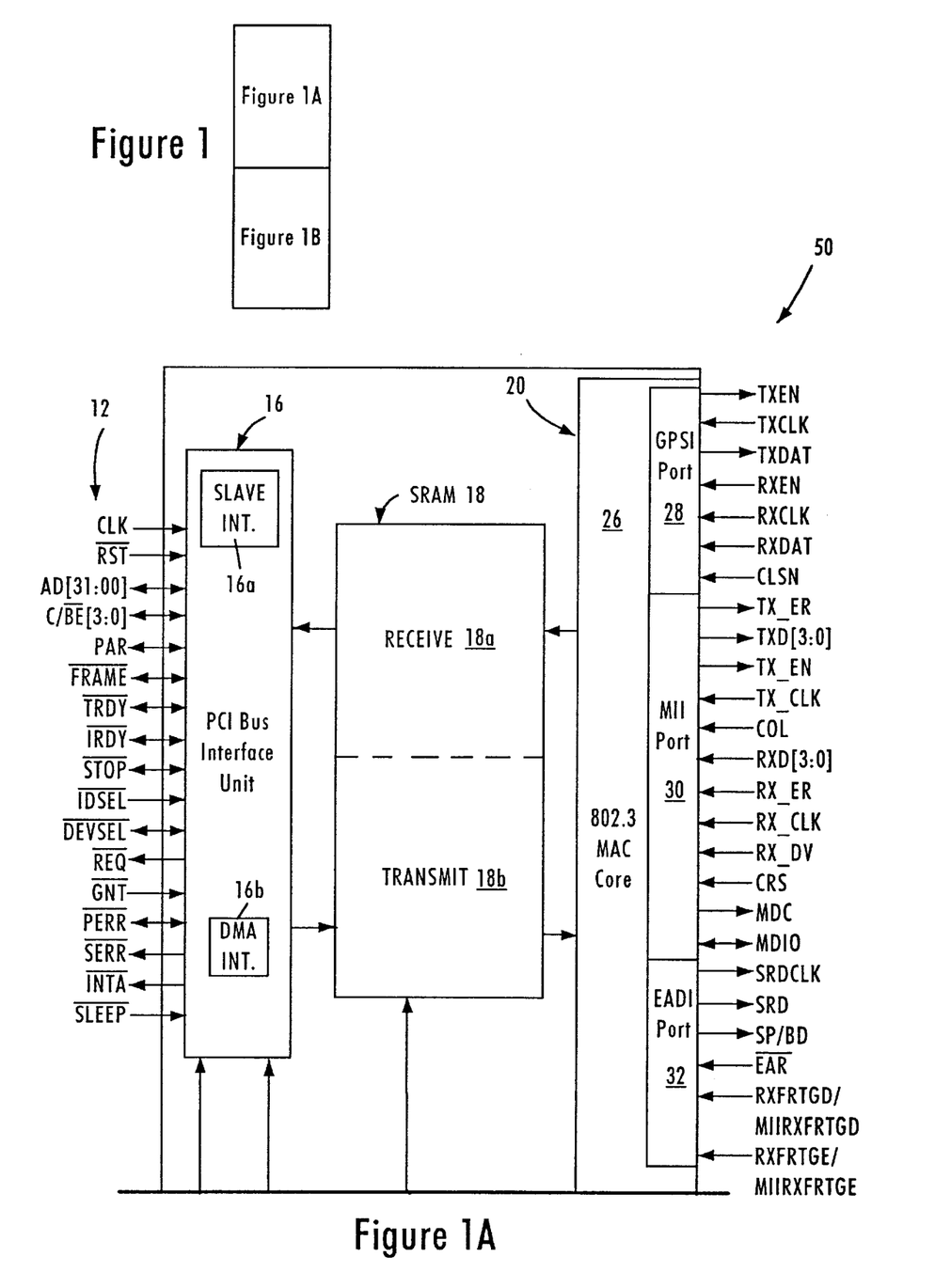
FIG. 1 is a block diagram illustrating the relationship between an exemplary network interface relative to a host computer workstation and a network.
Figure 1B:
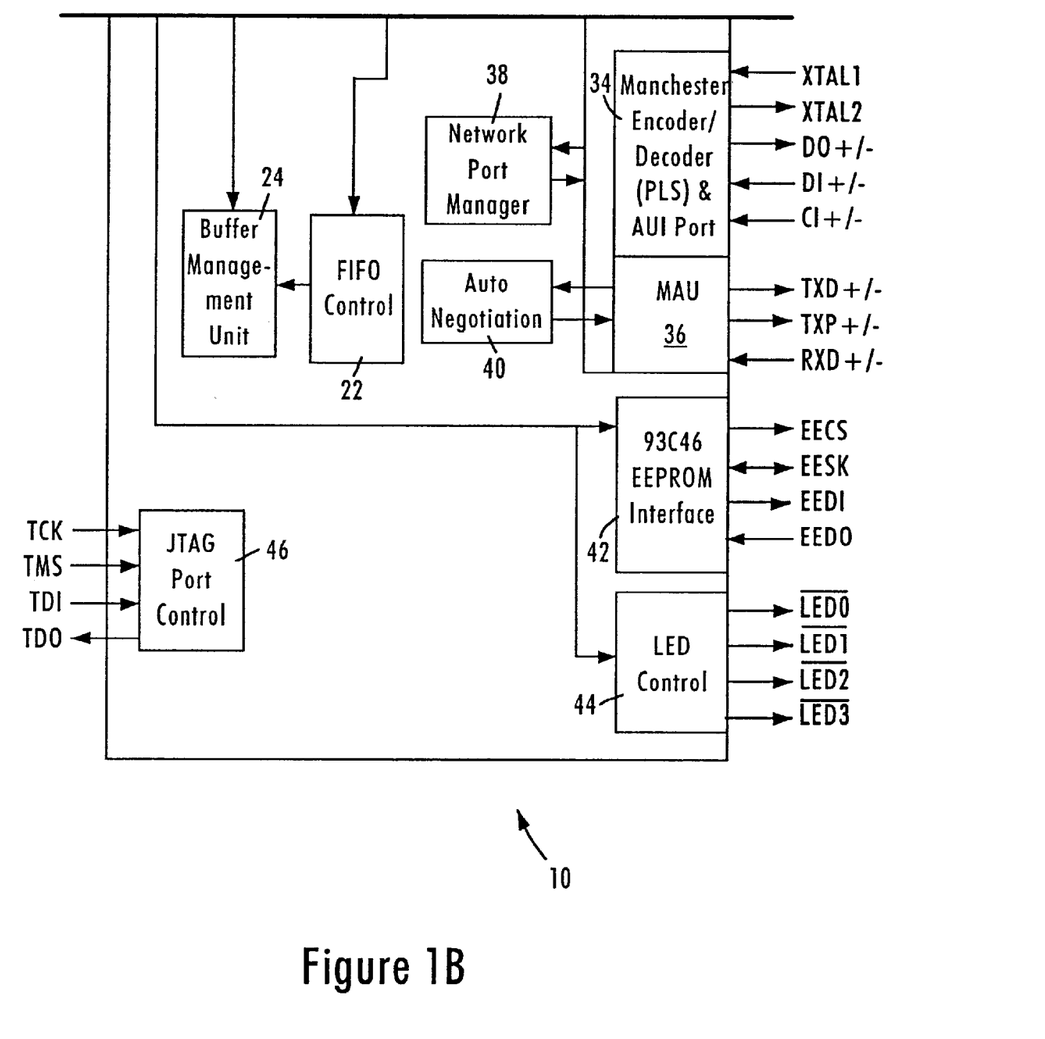

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

A The network interface 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down. Hence, the network interface can be configured to operate while the host computer is in a stand-by mode, enabling the network interface to output power up information to logic within the host computer to enable the host computer to automatically turn on in response to data packets received from the network and having a specific protocol, described below.

Memory Management Architecture

Figure 2:
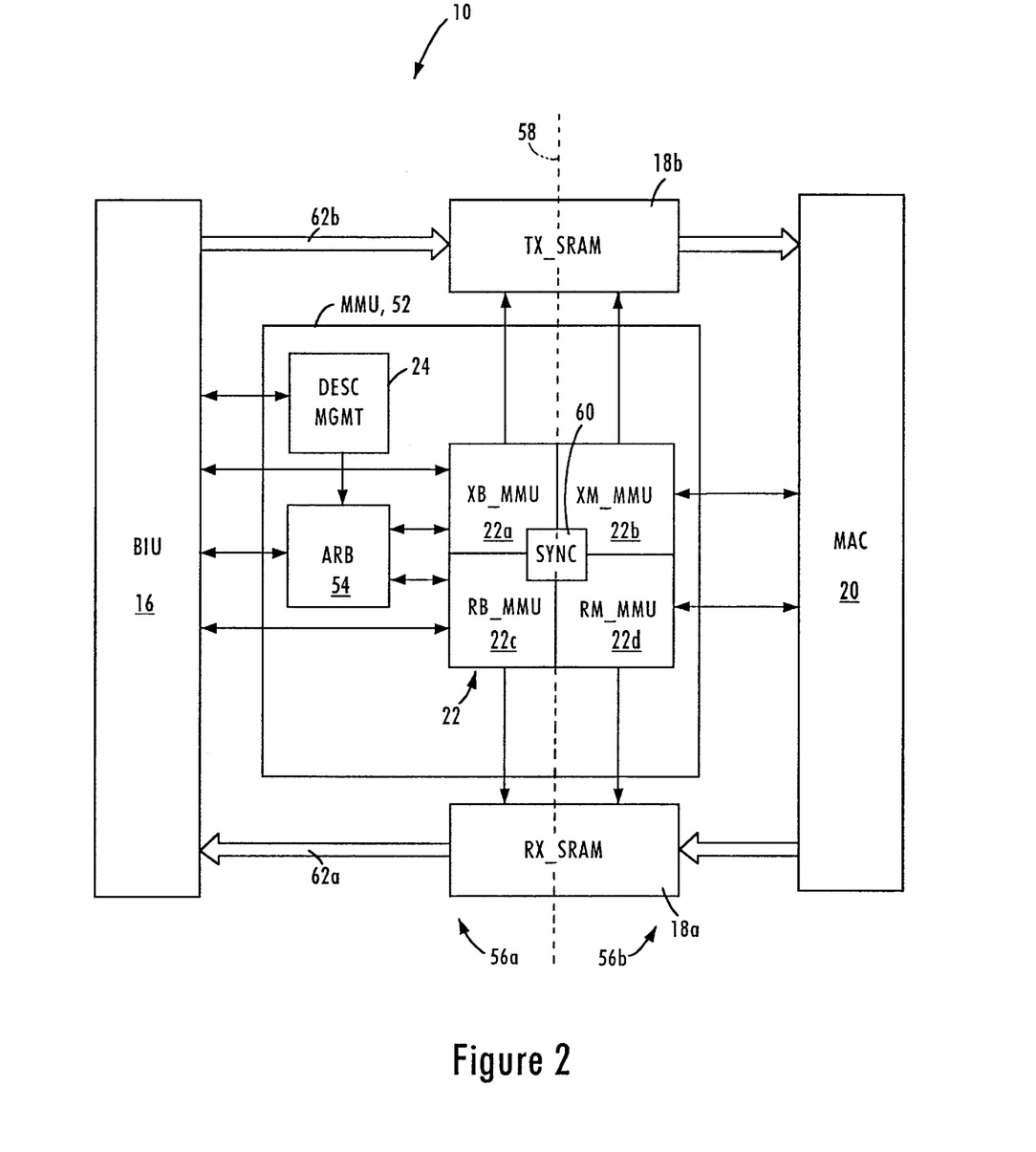
FIG. 2 is a block diagram illustrating the network interface shown in FIG. 1 in greater detail.

FIG. 2 is a block diagram illustrating the buffer architecture of the network interface 10 according to an embodiment of the present invention. As shown in FIG. 2, transfer of data frames between the BIU 16, and the MAC 20 is controlled by the memory management unit (MMU) 52 which includes a buffer management (DESC MGMT) unit 24 and a SRAM MMU 22. The MMU 52 controls the reading and writing of data to the receive SRAM portion 18a and the transmit SRAM portion 18b. It will be recognized in the art that the receive SRAM portion (RX_SRAM) 18a and the transmit SRAM portion (TX_SRAM) 18b may be implemented as a single memory device, or alternatively as two separate SRAM devices. The memory management unit 52 also includes an arbitration unit 54 which arbitrates DMA requests for data transmission, data reception, descriptor lists from the descriptor management block 24, and status.

The SRAM MMU 22 includes separate controllers for each SRAM portion 18a and 18b, for both read and write operations. According to the disclosed embodiment, the network interface 10 operates in two generic clock domains, namely a host computer bus clock domain 56a, and a network clock domain 56b. Since the network interface 10 needs to send and receive data across two independent clock domains 56, divided by the dotted line 58, the SRAM MMU 22 needs to be able to write and read data to each SRAM portion 18a and 18b in a manner that tracks memory status independent of the PCI clock in the host computer domain and the MAC clock generated from network activity in the network domain 56b.

According to the disclosed embodiment, the SRAM MMU 22 includes a transmit-data bus-side memory management unit (XB_MMU) 22a, a transmit-data MAC-side memory management unit (XM_MMU) 22b, a receive-data bus-side memory management unit (RB MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TCLK) received by the MAC 20. The XM_MMU 22b and the RB_MMU 22c operate as read controllers configured for reading frame data from the SRAMs 18b and 18a. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the T_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

MINIMIZING PCI WAIT STATES

As described above, a more efficient arbitration scheme is needed to reduce arbitration delays and wait states caused by arbitration algorithms implemented in the prior art.

According to the disclosed embodiment, the network interface minimizes wait states during a DMA transfer by outputting data sets from memory to holding registers. A bus access controller selectively outputs the data from the holding registers to an output holding register for output to a host bus with minimal wait states. The bus access controller controls the selection of data supplied to the output holding register based on detection of a target ready signal received from a target. Specifically, SRAM 18a supplies two data sets to a pair of holding registers based on a memory advance signal generated by BIU 16. BIU 16 selectively supplies one of the two data sets to the output holding register that supplies the selected data set to the target via the PCI bus 12, in response to a select signal generated within BIU 16. The select signal is generated based on whether there was a successful transfer of a previously selected data set to the target from the third register during the present clock cycle and the clock cycle immediately preceding the present clock cycle.

Figure 3:
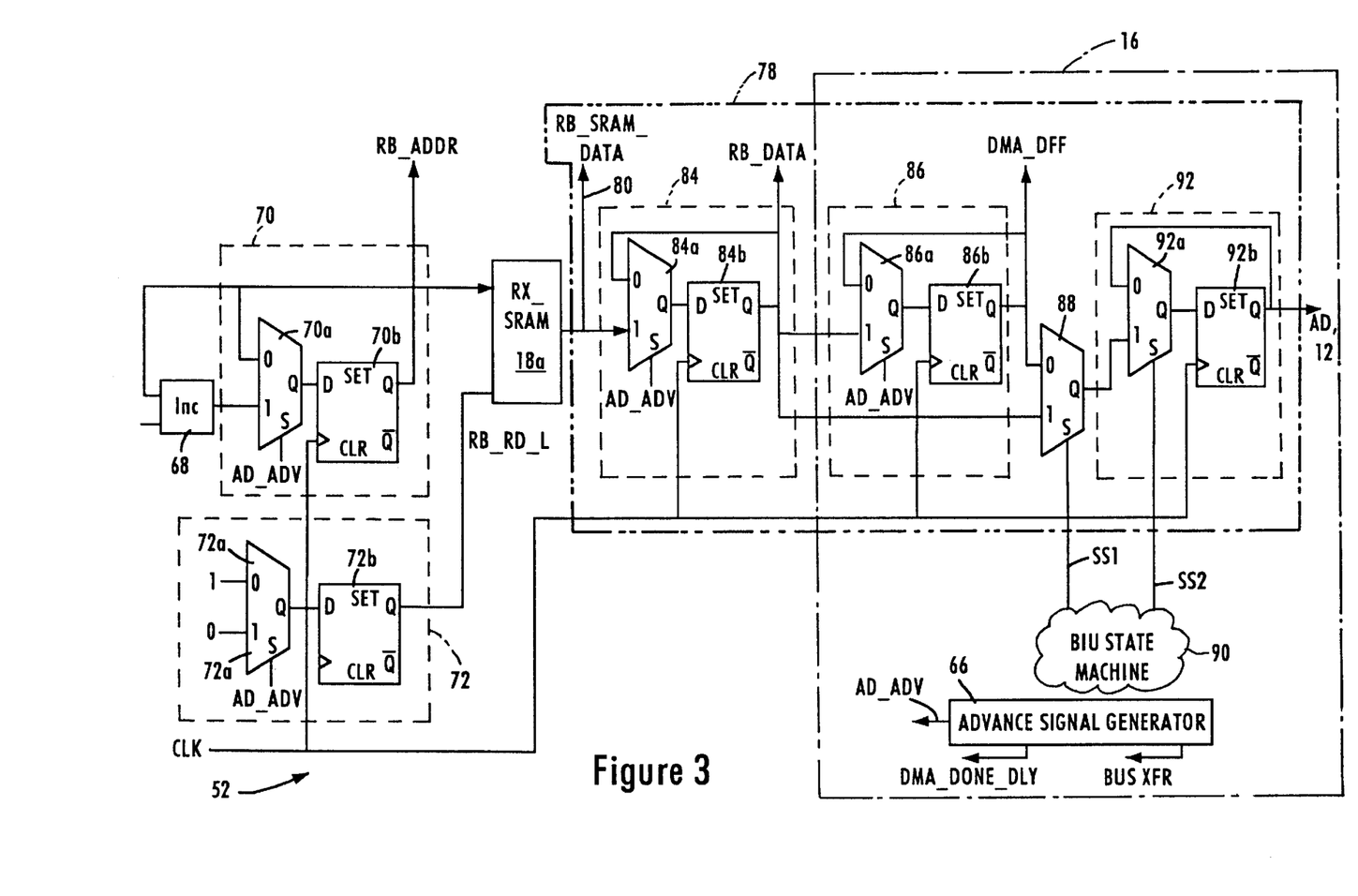
FIG. 3 is a diagram illustrating an exemplary configuration of an array of holding registers for outputting data onto a host bus with minimal wait states according to an embodiment of the present invention.

FIG. 3 is a diagram illustrating an exemplary configuration of an array of holding registers for outputting data onto a host bus with minimal wait states. BIU 16 includes an advance signal generator 66 that generates a memory advance signal (AD_ADV) used to select data output by the RX_SRAM 18a in a prescribed arrangement based on the readiness of the target to receive data from SRAM 18a. The leading edge of the PCI bus clock (CLK) is used as a timing mechanism for coordinating the selection of data dictated by the advance signal (AD_ADV).

MMU 52 includes an incrementer 68, an address holding register 70, and a read signal generator 72. The incrementer 68 supplies an incremented address to the address holding register 70. Address holding register 70 includes a multiplexer 70a that has a pair of inputs (0 and 1) that are selectively supplied (0 or 1) by a multiplexer output (Q) to an input (D) of a D flip-flop 70b based on the advance signal (AD_ADV) supplied to a selection input (S) of multiplexer 70a. D flip-flop 70b stores the address supplied by multiplexer output (Q), and has a D flip-flop output (Q) that latches the stored address as read address signal (RB_ADDR) for output to SRAM 18a in response to the leading edge of PCI bus clock (CLK). Thus, D flip-flop 70b is clocked by the PCI bus clock (CLK). D flip-flop 70b also latches the stored address from D flip-flop output (Q) to the first input (0) of multiplexer 70a. The supply of D flip-flop output (Q) back to multiplexer input (0) allows the same address to be stored in D flip-flop 70b for consecutive clock cycles, if necessary, based on the advance signal (AD_ADV) having a zero value. Multiplexer 70a supplies the incremented address from incrementer 68 for storage in D flip-flop 70b in response to an advance signal (AD_ADV) having a value of one supplied by advance signal generator 66 to selection input (S). Initially, a first read address A1 is stored in D flip-flop 70b.

The read signal generator 72 supplies a read line control signal (RB_RD_L) to SRAM 18*a* in response to the advance signal (AD_ADV=1) at the leading edge of PCI bus clock (CLK). Read signal generator 72 comprises a multiplexer 72*a* having a pair of inputs (0 and 1) that are selectively supplied (0 or 1), based on advance signal (AD_ADV=1), by a multiplexer output (Q) to an input (D) of a D flip-flop 72*b* used for storage. The input, labeled inside multiplexer 72*a* with a (1), is connected to an input line having a "low" value signal equal to zero. Since the read line control signal (RB_RD_L) is active low, an advance signal (AD_ADV) supplied to input (S) equal to one triggers read signal generator 72 to supply the read line control signal (RB_RD_L) to SRAM 18*a*. The input (0) of multiplexer 72*a* is connected to an input line having a "high" signal value equal to one which results in no supply of the read line control signal (RB_RD_L). D flip-flop 72*b* outputs the read line control signal (RB_RD_L) to SRAM 18*a* through an output (Q) also in response to the leading edge of PCI bus clock (CLK) which coordinates the arrival of the read line control signal (RB_RD_L) at SRAM 18*a* with the arrival of the read address signal (RB_ADDR) at SRAM 18*a*.

SRAM 18*a* supplies stored 32-bit data sets or words of frame data from a memory location specified by the read address signal (RB_ADDR) to a 32-bit array 78 of holding registers in response to the read line control signal (RB_RD_L) and the read address signal (RB_ADDR) simultaneously supplied at the leading edge of PCI bus clock (CLK). A data path (RB_SRAM_DATA) 80 supplies data from SRAM 18*a* to array 78.

The array 78 of holding registers comprises 32-bit holding registers 84 and 86 that output respective stored 32-bit values to a 32-bit multiplexer 88. The multiplexer 88 selectively outputs the values from at least one of the registers 84 and 86 to a 32-bit output holding register 92 for output onto 32-bit PCI bus 12 based on a pair of select signals SS1 and SS2 generated by a BIU state machine 90.

Holding register 84 comprises a multiplexer 84*a* and a D flip-flop 84*b*. Multiplexer 84*a* has a pair of inputs (0 and 1) that are selectively supplied (0 or 1) by a multiplexer output (Q) to an input (D) of D flip-flop 84*b* based on the advance signal (AD_ADV) supplied by advance signal generator 66 to a selection input (S) of multiplexer 84*a*. D flip-flop 84*b* stores the data set supplied by multiplexer output (Q), and has a D flip-flop output (Q) that supplies the stored data set to an input (1) of multiplexer 88 and to holding register 86 in response to the leading edge of PCI bus clock (CLK). D flip-flop 84*b* also supplies the stored data set from D flip-flop output (Q) to the first input (0) of multiplexer 84*a*. The supply of D flip-flop output (Q) back to multiplexer input (0) allows the same data set to be stored in D flip-flop 84*b* for consecutive clock cycles, if necessary, based on the advance signal (AD_ADV) having a zero value. Multiplexer 84*a* supplies the data set supplied from SRAM 18*a*, via data path (RD_SRAM_DATA) 80, for storage in D flip-flop 84*b* in response to an advance signal (AD_ADV) having a value of one. The primary function of holding register 84 is to supply stored data sets to an input (1) of multiplexer 88, and alternatively to retain stored data sets for later supply to input (1) of multiplexer 88.

Holding register 86 comprises a multiplexer 86*a* and a D flip-flop 86*b*. Multiplexer 86*a* has a pair of inputs (0 and 1) that are selectively supplied (0 or 1) by a multiplexer output (Q) to an input (D) of D flip-flop 86*b* based on the advance signal (AD_ADV) supplied by advance signal generator 66 to a selection input (S) of multiplexer 86*a*. D flip-flop 86*b* stores the data set supplied by multiplexer output (Q) of D flip-flop 84*b*, and has a D flip-flop output (Q) that supplies the stored data set to an input (0) of multiplexer 88 in response to the leading edge of PCI bus clock (CLK). D flip-flop 86*b* also supplies the stored data set from D flip-flop output (Q) to the first input (0) of multiplexer 86*a*. The supply of D flip-flop output (Q) 86*b* back to multiplexer input (0) of multiplexer 86*a* allows the same data set to be stored in D flip-flop 86*b* for consecutive clock cycles, if necessary, based on the advance signal (AD_ADV) having a zero value. Multiplexer 86*a* supplies the data set supplied from holding register 84 for storage in D flip-flop 86*b* in response to an advance signal (AD_ADV) having a value of one supplied by advance signal generator 66 to selection input (S). The primary function of holding register 86 is to supply stored data sets to an input (0) of multiplexer 88, and alternatively to retain stored data sets for later supply to input (0) of multiplexer 88.

Multiplexer 88 has a pair of 32-bit inputs (0 and 1) that are selectively supplied (0 or 1) by a multiplexer output (Q) to output holding register 92 based on a select signal SS1 supplied by BIU state machine 90 to a selection input (S) of multiplexer 88. Multiplexer 88 is the gate through which either the data set supplied by register 84 or register 86 is supplied to output holding register 92 for output to the target using PCI bus 12. In addition, the select signal SS1 may include, for example, 4-bit or 32-bit selection values for selecting the data for byte alignment on the PCI bus on a per-byte or per-bit basis, respectively.

Output holding register 92 comprises a multiplexer 92*a* and a D flip-flop 92*b*. Multiplexer 92*a* has a pair of inputs (0 and 1) that are selectively supplied (0 or 1) by a multiplexer output (Q) to an input (D) of D flip-flop 92*b* based on a select signal SS2 supplied by BIU state machine 90 to a selection input (S) of multiplexer 92*a*. D flip-flop 92*b* stores the data set supplied by multiplexer output (Q), and has a D flip-flop output (Q) that supplies the stored data set to PCI bus (AD) 12 in response to the leading edge of PCI bus clock (CLK). D flip-flop 92*b* also supplies the stored address from D flip-flop output (Q) to the first input (0) of multiplexer 92*a*. The supply of D flip-flop output (Q) back to multiplexer input (0) allows the same data set to be stored in D flip-flop 92*b* for consecutive clock cycles, if necessary, based on the advance signal (AD_ADV) having a zero value. Multiplexer 92*a* supplies the data set supplied from holding register 84 for storage in D flip-flop 92*b* in response to an advance signal (AD_ADV) having a value of one supplied by advance signal generator 66 to selection input (S).

BIU state machine 90 controls which data set, supplied by register 84 and register 86, multiplexer 88 supplies to output holding register 92 based on the select signal SS1 output by BIU state machine 90. BIU state machine 90 generates select signals SS1 and SS2 based on signals supplied over PCI bus 12 and detected by BIU 16. BIU 16 detects signals that include a DMA request signal supplied by MMU 52 which indicates a request for use of PCI bus 12 by the network interface 10, atrget ready signal (TRDY#) which indicates a readiness of the target to receive data, and a successful transfer signal (XFR) which indicates a successful transfer from array 78 and reception by the target of a data set.

Assuming selection on a double-word basis, BIU state machine 90 generates select signal SS1 equal to one, which enables the register 84 to supply output holding register 92 the data set stored in D flip-flop 84*b*. The BIU state machine 90 sets SS1 equal to one based on whether BIU 16 detects successful transfer signal (XFR) at the leading edge of the current clock cycle and also at the leading edge of the preceding clock cycle. If BIU 16 detects no successful transfer signal (XFR) at the leading edge of the current clock cycle and also at the leading edge of the preceding clock cycle, then BIU state machine generates select signal SS1 equal to zero which enables register 86 to supply register 92 with the data set stored in D flip-flop 86*b*. Thus, BIU state machine 90 generates select signal SS1 having a value equal to one in response to BIU 16 detecting two consecutive successful transfers (XFR) of data, one during the current clock cycle and one during the immediately preceding clock cycle.

Figure 4:
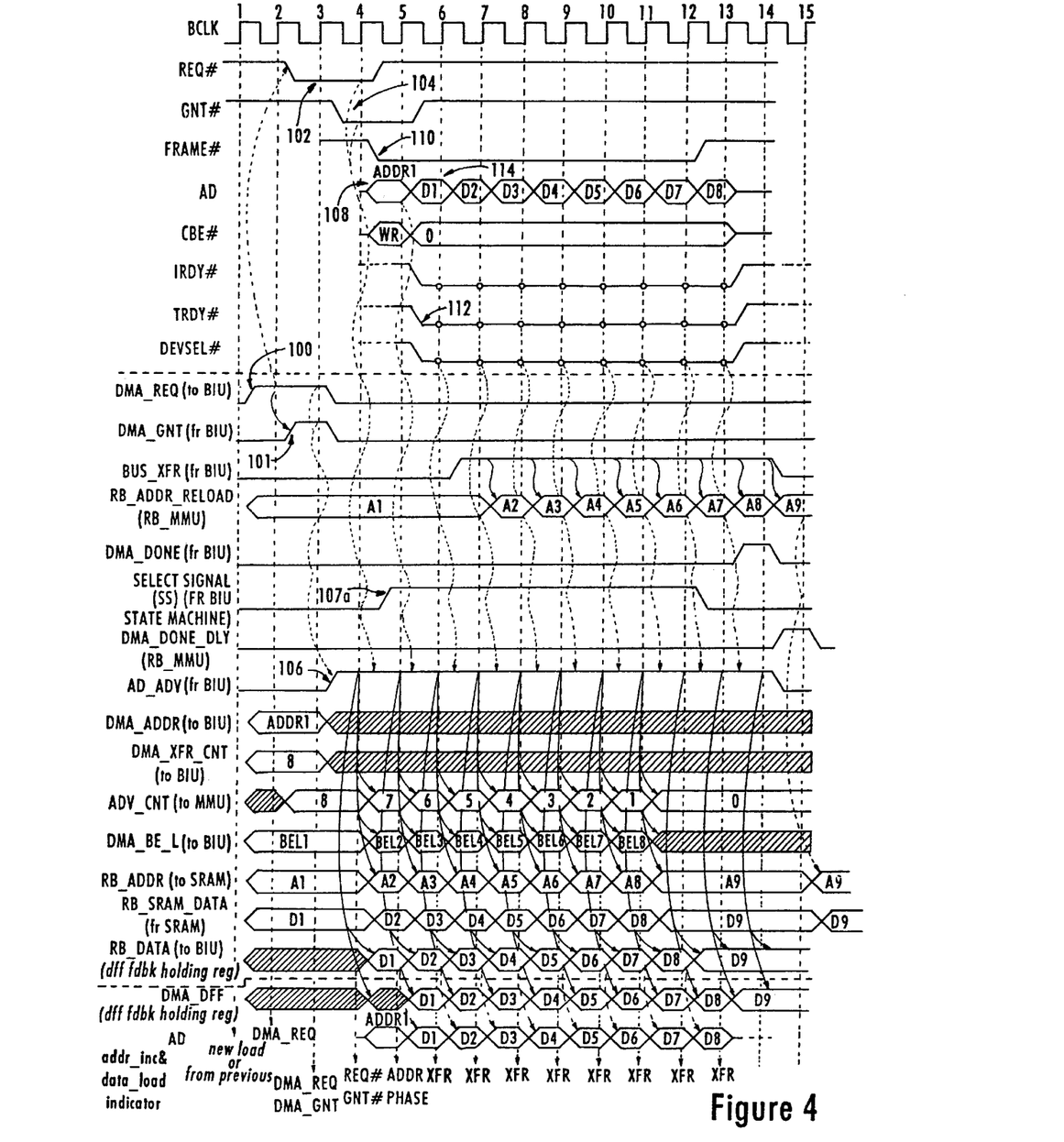
FIG. 4 is a timing diagram illustrating a relationship between signals and data utilized by an exemplary embodiment of the network interface of the present invention.
Figure 5:
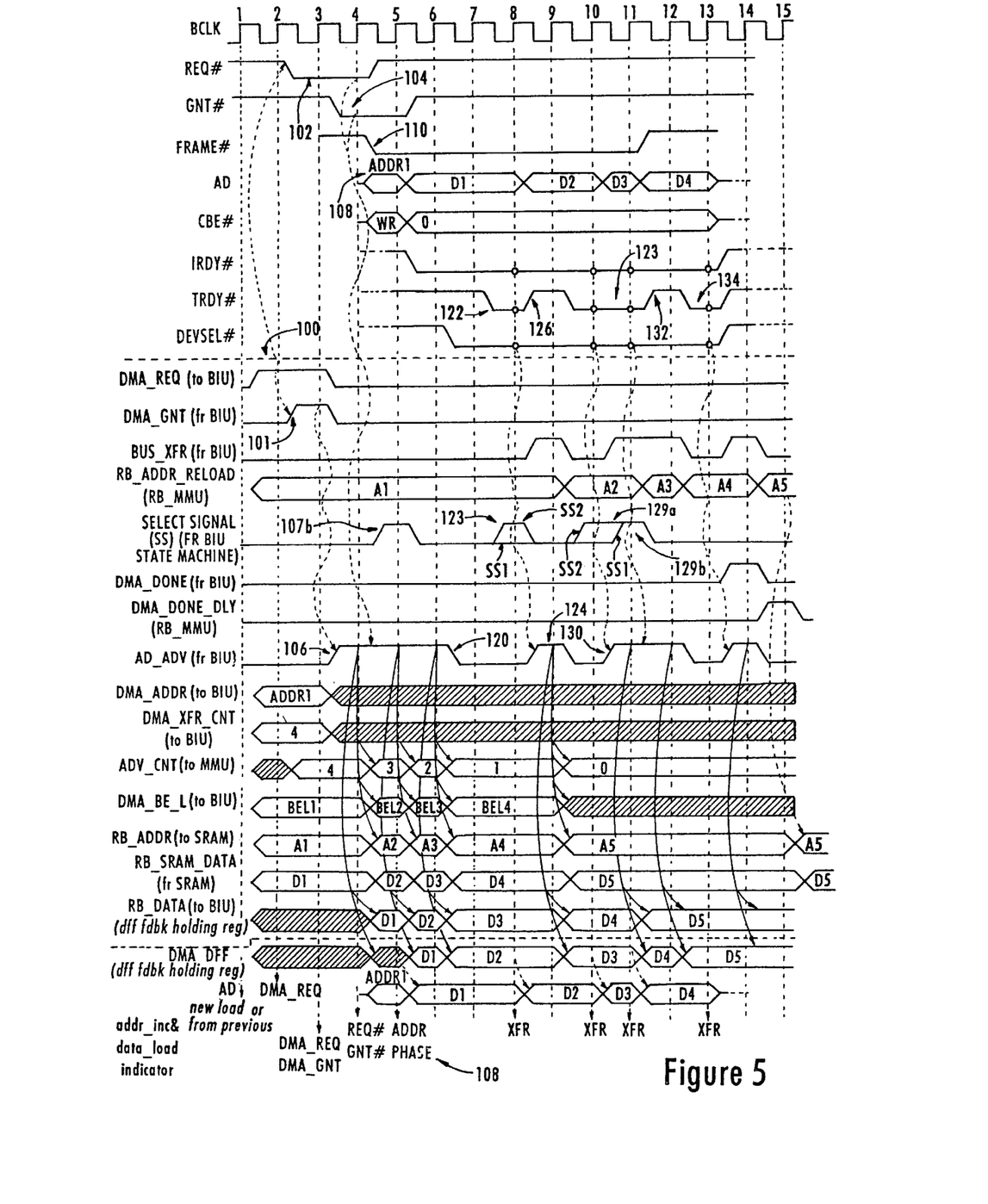
FIG. 5 is a timing diagram illustrating signals and data of another exemplary embodiment of the present invention.

FIGS. 4 and 5 are timing diagrams illustrating examples of outputting data from the RX SRAM 18*a* to the PCI bus 12 according to an embodiment of the present invention. FIGS. 4 and 5 illustrate differing data transactions which result based on select signals SS1 and SS2 (shown together in FIGS. 4 and 5 as select signal SS) generated by BIU state machine 90 in response to the various signals detected on PCI bus 12 by BIU 16. Initially, SRAM 18*a* supplies a first 32-bit data set, which corresponds to the address Al originally stored in D flip-flop 70*b*, to data path (RB_SRAM_DATA) 80 in response to the leading edge of the first clock cycle which triggers the read line signal (RB_RD_L) according to the description provided above.

In both FIGS. 4 and 5, descriptor management unit 24 initiates a request to perform a DMA transfer on the PCI bus 12 by outputting a DMA request signal (DMA_REQ), a DMA address (pointing to a target location in system memory), and a number (DMA_XFR_CNT) of transfers to be made to complete the write burst during clock cycle 1 to BIU 16 at event 100. A write burst is a predefined number (e.g., 8) of data sets that comprise a data frame. The BIU 16 then recognizes the DMA request signal (DMA_REQ) at the leading edge of clock cycle 2, and in response outputs a DMA grant signal (DMA_GTN) to the descriptor management unit 24 and the RB_MMU 22*c* at event 101. During clock cycle 2 at event 102, the BIU 16 asserts a request signal (REQ#) in response to the DMA request signal (DMA_REQ), and waits for a PCI arbiter (e.g., the host CPU) to assert a grant signal (GNT#) when the PCI bus 12 is available for transaction, in this case at event 104 beginning in the middle of clock cycle 3.

Advance signal generator 66 initiates the assertion of an advance signal (AD_ADV) from BIU 16 at event 106 in response to the concurrent assertion of the request signal (DMA_REQ) by the descriptor management unit 24 and the grant signal (DMA_GNT) by the BIU 16. The SRAM 18*a* outputs via signal path (RB_SRAM_DATA) 80 the first 32-bit data set (D1) to multiplexer 84*a*, and multiplexer 84*a* outputs the supplied data from the RX_SRAM 18*a* in response to the advance signal (AD_ADV) asserted by advance signal generator 66 through the leading edge of clock cycle 4. Incrementer 68 increments the address (RD_ADDR) stored in register 70 to A2 based on the advance signal (AD_ADV), and D flip-flop 70*b* supplies address A2 to SRAM 18*a* in response to the leading edge of clock cycle 4. Read signal generator 72 generates read line control signal (RB_RD_L) in response to the advance signal (AD_ADV), and D flip-flop 72*b* supplies the read line control signal (RB_RD_L) to SRAM 18*a* in response to the leading edge of clock cycle 4. SRAM 18*a* supplies a second data set (D2) during clock cycle 4 to data path (RB_SRAM_DATA) 80 in response to receiving the address signal (RB_ADDR) containing address A2 and the read line control signal (RB_RD_L).

During clock cycle 4, BIU 16 outputs a target address signal having the value ADDR1 onto PCI bus (AD) 12 in response to the grant signal (GNT#) asserted by the PCI arbiter on host PCI bus 12. The transfer and reception of the address data (ADDR1) is known as an address phase and is shown at event 108.

Advance signal generator 66 continues the assertion of advance signal (AD_ADV) beyond the leading edge of cycle 4 and through the leading edge of clock cycle 5 based on the concurrent assertion of both request signal (REQ#) and grant signal (GNT #) by the PCI arbiter. Register 84 supplies the first data set (D1) to input (1) of multiplexer 88 and to register 86 in response to the advance signal (AD_ADV) maintained by advance signal generator 66 through at the leading edge of clock cycle 5.

BIU state machine 90 supplies select signal SS1 equal to one at event 107*a* (FIG. 4) and event 107*b* (FIG.5) to select input (S) of multiplexer 88 to govern the supply of the first data set (D1) by multiplexer 88 to the input (1) of multiplexer 92*a*. BIU state machine 90, simultaneous to the supply of select signal SS1, supplies select signal SS2 equal to one to regulate the supply of the first data set (D1) by multiplexer 92*a* for storage in D flip-flop 92*b*. BIU state machine 90 generates select signals SS1 and SS2 at this time (before any data set of the current write burst has been transferred to the target) in order to provide the first data set (D1) of the write burst supplied from SRAM 18*a* to output holding register 92 immediately, bypassing storage in register 86, to accommodate the possible readiness of the target. BIU state machine 90 also supplies select signal SS2 having a value of one to multiplexer 92*a* which supplies D flip-flop 92*b* with the first data set to prepare for the possible readiness of the target.

Multiplexer 84*a* supplies from signal path (RB_SRAM_DATA) 80 the second data set (D2) to D flip-flop 84*b* in response to the advance signal (AD_ADV) maintained by advance signal generator 66 through at the leading edge of clock cycle 5. Incrementer 68 increments the address (RD_ADDR) stored in register 70 to A3 based on the advance signal (AD_ADV), and D flip-flop 70*b* latches address A3 to SRAM 18*a* beginning at the leading edge of clock cycle 5. Read signal generator 72 generates read line control signal (RB_RD_L) in response to the advance signal (AD_ADV), and D flip-flop 72*b* latches the read line control signal (RB_RD_L) to SRAM 18*a* beginning at the leading edge of clock cycle 5. SRAM 18*a* supplies a third data set (D3) during clock cycle 5 to data path (RB_SRAM_DATA) 80 in response to receiving the address A3 and the read line control signal (RB_RD_L).

In FIGS. 4 and 5, BIU 16 asserts a frame signal (FRAME#), at event 110 during clock cycle 4, on PCI host bus 12 to indicate the BIU 16, as initiator of the transfer, is ready to begin the transfer of data. (Signals followed by "#" are active low.) In contrast, prior art systems experience much longer arbitration delays and wait states because these prior art systems wait until the frme signal (FRAME#) is asserted before retrieving the first data set (D1) from memory. As a consequence, prior art systems may require multiple wait states.

The presently described arrangement, however, stores multiple data sets onto the holding registers of array 78 based on signals generated by the advance signal generator 66 and the BIU state machine 90, independent of the assertion of the frame signal (FRAME#). Hence, the disclosed embodiment stores the first data set (D1) into output holding register 92 based on the select signals SS1 and SS2 generated by BIU state machine 90 during clock cycle 5 whose leading edge is the same time at which the frame signal (FRAME#) is initially detected, thus eliminating unnecessary arbitration delays and wait states. Furthermore, the second data set (D2) has been supplied to holding register 84 and the third data set (D3) is being supplied to data path (RB_SRAM_DATA) 80 from SRAM 18a during clock cycle 5.

In FIG. 4, the target asserts and supplies the target ready signal (TRDY#) on PCI bus 12 at event 112 indicating the target is ready to receive data transferred from SRAM 18a. Output holding register 92 successfully transfers (XFR) the first data set (D1) to the target via PCI bus (AD) 12 at event 114 at the leading edge of clock cycle 6 in response to BIU 16 detecting the target ready signal (TRDY#) at the leading edge of cycle 6. BIU 16 also detects the assertion of IRDY# and DEVSEL# which are necessary for data transfer, but understood by those of ordinary skill and need not be explained here.

Advance signal generator 66 maintains the assertion of the advance signal (AD_ADV) from BIU 16 through the remainder of clock cycle 5 and through the leading edge of clock cycle 6 in response to the entry of the address phase at event 108. Register 84 supplies the second data set (D2) to input (1) of multiplexer 88 and to register 86 in response to the advance signal (AD_ADV) maintained by advance signal generator 66 through the leading edge of clock cycle 6.

In FIG. 4, BIU state machine 90 supplies select signal SS1 having a value equal to one to multiplexer 88, at event 107a through the leading edge of clock cycle 6, to govern the supply of the second data set (D2) by multiplexer 88 to the input (1) of multiplexer 92a. BIU state machine 90 continues to supply select signal SS1 having a value of one based on the successful transfer (XFR) of the first data set (D1) immediately after storage in register 92 which depletes register 92 of data. Therefore, BIU state machine 90 controls multiplexer 88 to supply register 92 with new data, bypassing storage in register 86, to continue to accommodate the readiness of the target. BIU state machine 90 also supplies select signal SS2 having a value of one to multiplexer 92a to supply D flip-flop 92b with the second data set (D2) preparing for the possible continued readiness of the target.

Signal path (RB_SRAM_DATA) 80 supplies the third data set (D3) from SRAM 18a to register 84 during clock cycle 6 in response to the advance signal (AD_ADV) maintained at the leading edge of clock cycle 6. Incrementer 68 increments the address (RD_ADDR) stored in register 70 to A4 based on the advance signal (AD_ADV), and D flip-flop 70b latches address A4 to SRAM 18a beginning at the leading edge of clock cycle 6. Read signal generator 72 generates read line control signal (RB_RD_L) in response to the advance signal (AD_ADV), and D flip-flop 72b latches the read line control signal (RB_RD_L) to SRAM 18a beginning at the leading edge of clock cycle 6. SRAM 18a supplies a fourth data set (D4) during clock cycle 6 to data path (RB_SRAM_DATA) 80 in response to receiving the address A4 and the read line control signal (RB_RD_L).

In FIG. 4, the target maintains the assertion of the target ready signal (TRDY#) on PCI bus 12 at the leading edge of clock cycle 7 indicating the target continues to be ready to receive additional data transferred from SRAM 18a. Output holding register 92 successfully transfers (XFR) the second data set (D2) to the target via PCI bus (AD) 12 at the leading edge of clock cycle 7 in response to detecting the target ready signal (TRDY#) at the leading edge of cycle 7.

Advance signal generator 66 maintains the assertion of the advance signal (AD_ADV) from BIU 16 through the remainder of clock cycle 6 and through the leading edge of clock cycle 7 in response to the target ready signal (TRDY#) detected by BIU 16 at the leading edge of clock cycle 5. Register 84 supplies the third data set (D3) to input (1) of multiplexer 88 and to register 86 in response to the advance signal (AD_ADV) maintained by advance signal generator 66 through the leading edge of clock cycle 7.

BIU state machine 90 continues to supply select signal SS1 having a value equal to one to multiplexer 88, at event 107a through the leading edge of clock cycle 7 based on the successful transfer (XFR) of the second data set at the leading edge of the current clock cycle (clock 7) and the first data set (D1) at the leading edge of the preceding clock cycle (clock 6). In this way, BIU state machine governs the supply of the third data set (D3) by multiplexer 88 to the input (1) of multiplexer 92a. BIU state machine 90 also supplies select signal SS2 having a value of one to multiplexer 92a in order to regulate the supply of the third data set (D3) by multiplexer 92a for storage in D flip-flop 92b based on the successful transfer (XFR) of the first data set (D1) at the leading edge of the preceding clock cycle (clock 6). Thus, BIU state machine 90 supplies select signals SS1 and SS2 in response to BIU 16 detecting two consecutive successful transfers (XFR) of data, one during the current clock cycle and one during the immediately preceding clock cycle.

Signal path (RB_SRAM_DATA) 80 supplies the fourth data set (D4) from SRAM 18a to register 84 in response to the advance signal (AD_ADV) maintained at the leading edge of clock cycle 7. Incrementer 68 increments the address (RD_ADDR) stored in register 70 to A5 based on the advance signal (AD_ADV), and D flip-flop 70b latches address A5 to SRAM 18a beginning at the leading edge of clock cycle 7. Read signal generator 72 generates read line control signal (RB_RD_L) in response to the advance signal (AD_ADV), and D flip-flop 72b latches the read line control signal (RB_RD_L) to SRAM 18a beginning at the leading edge of clock cycle 7. SRAM 18a supplies a fifth data set (D5) during clock cycle 7 to data path (RB_SRAM_DATA) 80 in response to receiving the address A5 and the read line control signal (RB_RD_L).

The cycle of data set transfers described above in conjunction with data sets D1, D2, and D3 continues in FIG. 4 until eight total data sets are transferred from SRAM 18a to the target based on the continued readiness of the target to receive data during the clock cycles beginning with the leading edge of clock 6 and ending after the leading edge of clock 13. The number originally stored in (DMA_XFR_CNT) in FIG. 4 to indicate the number of successful transfers required to complete a write burst transfer of data sets from SRAM 18a to the target is eight. Thus, the write burst in FIG. 4 is completed at the leading edge of clock cycle 13 with the transfer of an eighth data set (D8) from register 92 to the target over PCI bus (AD) 12.

The operation of the exemplary embodiment discussed in FIG. 4 is similar in many respects to the operation of the exemplary embodiment discussed in FIG. 5. With the exception of the number originally stored in (DMA_XFR_CNT) defining the number of data set transfers (4 in FIG. 5; 8 in FIG. 4), the first data set (D1) and the second data set (D2) are loaded into registers 92/86 and 84, respectively, in the same manner. FIG. 5 differs from FIG. 4 thereafter based on the operation of the BIU state machine 90 which supplies the select signals SS1 and SS2 in turn based on BIU 16 detecting assertion of the target ready signal (TRDY#) that causes data transfer from register 92.

In contrast with FIG. 4, the target ready signal (TRDY#) is not asserted by the target during clock cycle 5. Therefore, D flip-flop 92b "holds" the first data set (D1) on the AD signal path of the PCI bus 12, and in output holding register 92, by latching the first data set (D1) back into input (0) of multiplexer 92a at the leading edge of clock cycle 6 while also maintaining the first data set (D1) on bus 12 for transfer to the target. BIU state machine 90 selects input (0) of multiplexer 92a by supplying select signal SS2 equal to zero such that multiplexer 92a outputs the first data set (D1) to D flip-flop 92b.

In FIG. 5, advance signal generator 66 maintains the assertion of the advance signal (AD_ADV) from BIU 16 through the remainder of clock cycle 5 and through the leading edge of clock cycle 6 in response to the entry of the address phase at event 108 in which the target address signal (RB_ADDR) having a value of ADDR1 is transferred to PCI bus 12. D flip-flop 84b latches the second data set (D2) to input (1) of multiplexer 88 and to input (1) of D flip-flop 86a in response to the leading edge of clock cycle 6, and since advance signal (AD_ADV) is maintained by advance signal generator 66 through the leading edge of clock cycle 6, multiplexer 86a supplies the second data set (D2) to D flip-flop 86b. Multiplexer 84a supplies the third data set (D3) from signal path (RB_SRAM_DATA) 80 to D flip-flop 84b during clock cycle 6 in response to the advance signal (AD_ADV) maintained at the leading edge of clock cycle 6. Incrementer 68 increments the address (RD_ADDR) stored in register 70 to A4 based on the advance signal (AD_ADV), and D flip-flop 70b latches address A4 to SRAM 18a beginning at the leading edge of clock cycle 6. Read signal generator 72 generates read line control signal (RB_RD_L) in response to the advance signal (AD_ADV), and D flip-flop 72b latches the read line control signal (RB_RD_L) to SRAM 18a beginning at the leading edge of clock cycle 6. SRAM 18a supplies a fourth data set (D4) during clock cycle 6 to data path (RB_SRAM_DATA) 80 in response to receiving the address A4 and the read line control signal (RB_RD_L).

Advance signal generator 66 deasserts the advance signal at event 120 during clock cycle 6 based on BIU 16 not detecting any target ready signal (TRDY#) on PCI bus 12. Registers 92, 86 and 84 "hold" data sets D1, D2 and D3 respectively at the leading edge of clock cycle 7 in response to the respective multiplexers 92a, 86a, and 84a, each receiving the deasserted AD_ADV signal.

The target asserts and supplies the target ready signal (TRDY#) over PCI bus 12 at event 122 during clock cycle 7 when the target is ready to receive data. Register 92 successfully transfers (XFR) at the leading edge of clock cycle 8 the first data set (D1) to the target via PCI bus (AD) 12 in response to BIU 16 detecting the target ready signal (TRDY#) at the leading edge of clock cycle 8. Also in response to the transfer (XFR) at the leading edge of clock cycle 8, BIU state machine 90 supplies select signal SS1 having a value of zero to multiplexer 88 causing D flip-flop 86b to supply the second data set (D2) to multiplexer 92a. (In order for BIU state machine 90 to have supplied a select signal having a value of one to govern multiplexer 88 to supply the second data set (D2) from D flip-flop 84b, a successful transfer of data would have had to occur at the leading edge of clock cycle 7 which immediately precedes the current clock cycle 8. This was discussed above in conjunction with the leading edges of clock cycles 7–12 of FIG. 4.)

BIU state machine 90 also supplies select signal SS2 having a value of one to multiplexer 92a at event 123 in response to BIU 16 detecting the transfer (XFR). In response to select signal SS2, multiplexer 92a supplies the second data set (D2) to D flip-flop 92b at the leading edge of clock cycle 8. D flip-flop 92b latches the second data set (D2) in response to the leading edge of clock cycle 8 in order to output the second data set (D2) to bus 12 until the target asserts the target ready signal (TRDY#).

D flip-flop 86b outputs the second data set (D2) to input (0) of multiplexer 86a at the leading edge of clock cycle 8 and multiplexer 86a supplies the second data set (D2) to D flip-flop 86b based on deassertion of advance signal (AD_ADV). BIU 16 deasserts advance signal AD)_ADV in response to detecting no target ready signal (TRDY#) on bus 12. D flip-flop 84b outputs the third data set (D3) back to input (0) of multiplexer 84a at the leading edge of clock cycle 8, and multiplexer 84a supplies the third data set (D3) to D flip-flop 84b based on the advance signal (AD_ADV) having a value of zero.

Advance signal generator 66 asserts the advance signal (AD_ADV) from BIU 16 at event 124 through the leading edge of clock cycle 9 in response to the assertion of the target ready signal detected by BIU 16 at the leading edge of clock cycle 8. D flip-flop 84b supplies the third data set (D3) to input (1) of multiplexer 88 and to multiplexer 86a at the leading edge of clock cycle 9, and multiplexer 86a supplies D3 to D flip-flop 86b in response to the advance signal (AD_ADV) maintained by advance signal generator 66 through the leading edge of clock cycle 9.

Multiplexer 84a supplies the fourth data set (D4) from signal path (RB_SRAM_DATA) 80 to D flip-flop 84b in response to the advance signal (AD_ADV) maintained at the leading edge of clock cycle 9. Incrementer 68 supplies the address A5 to register 70 and multiplexer 70 supplies A5 to 70b based on the advance signal (AD_ADV). D flip-flop 70b then supplies address A5 to SRAM 18a beginning at the leading edge of clock cycle 9. Read signal generator 72 generates read line control signal (RB_RD_L) in response to the advance signal (AD_ADV), and D flip-flop 72b supplies the read line control signal (RB_RD_L) to SRAM 18a beginning at the leading edge of clock cycle 9. SRAM 18a supplies a fifth data set (D5) during clock cycle 9 to data path (RB_SRAM_DATA) 80 in response to receiving the address A5 and the read line control signal (RB_RD_L).

The target deasserts the target ready (TRDY#) over PCI bus 12 at event 126 because the target is no longer ready to receive data. D flip-flop 92b "holds" the second data set (D2) in output holding register 92 by latching the second data set (D2) back into input (0) of multiplexer 92a at the leading edge of clock cycle 9 while also maintaining the second data set (D2) on PCI bus 12. BIU state machine 90 selects input (0) of multiplexer 92a by supplying select signal SS2 equal to zero such that multiplexer 92a outputs the second data set (D2) to D flip-flop 92b. Advance signal generator 66 deasserts the advance signal (AD_ADV) after the leading edge of clock pulse 9 in response to the deassertion of the target ready signal (TRDY#). Deassertion of the advanced signal (AD_ADV) causes the data D2 to be output by D flip-flop 92b until detection of the target ready signal (TRDY#).

The target asserts and supplies the target ready signal (TRDY#) over PCI bus 12 at event 128 indicating the ability of the target to again receive data. Register 92 successfully transfers (XFR) at the leading edge of clock cycle 10 the second data set (D2) to the target using PCI bus 12 in response to BIU 16 detecting the target ready signal (TRDY#) at the leading edge of clock cycle 10.

BIU state machine 90 supplies select signal SS1 having a value of zero to multiplexer 92a in order to supply the third data set (D3) from D flip-flop 86b to multiplexer 92a in response to the successful transfer (XFR) at the leading edge of the clock cycle 10. BIU state machine 90 supplies select signal SS2 having a value of one at event 129a to multiplexer 92a, in order to supply the third data set (D3) from register 86 to D flip-flop 92b during clock cycle 10, in response to the successful transfer (XFR) at the leading edge of the clock cycle 10.

Advance signal generator 66 supplies the advance signal (AD_ADV) from BIU 16 at event 130 through the leading edge of clock cycle 11 in response to the assertion of the target ready signal detected by BIU 16 at the leading edge of clock cycle 10. D flip-flop 84b supplies the fourth data set (D4) to input (1) of multiplexer 88 and to multiplexer 86a at the leading edge of clock cycle 11. The multiplexer 86a supplies the fourth data set (D4) to D flip-flop 86b in response to the advance signal (AD_ADV) supplied by advance signal generator 66 through the leading edge of clock cycle 11.

The target maintains the target ready signal (TRDY#) over PCI bus 12 at event 128 through the leading edge of clock cycle 11 indicating the continued ability of the target to receive data. Register 92 successfully transfers (XFR) at the leading edge of clock cycle 11 the third data set (D3) to the target using PCI bus 12 in response to BIU 16 detecting the target ready signal (TRDY#) at the leading edge of clock cycle 11.

At clock cycle 11, BIU state machine 90 supplies select signal SS1 having a value equal to one to multiplexer 88 at event 129b to govern the supply of the fourth data set (D4) by multiplexer 88 to the input (1) of multiplexer 92a based on the successful transfer (XFR) of the second data set (D2) at the leading edge of the preceding clock cycle (clock 10). BIU state machine 90 also maintains the supply of select signal SS2 having a value of one to multiplexer 92a in order to control the supply of the fourth data set (D4) by multiplexer 92a for storage in D flip-flop 92b based on the successful transfer (XFR) of the second data set (D2) at the leading edge of the preceding clock cycle (clock 10). Multiplexer 84a supplies the fifth data set (D5) from SRAM 18a to D flip-flop 84b in response to the advance signal (AD_ADV) at event 130, and D flip-flop 84b latches at the leading edge of clock cycle 11.

Advance signal generator 66 maintains the advance signal (AD_ADV) from BIU 16 at event 130 through the leading edge of clock cycle 12 in response to the assertion of the target ready signal maintained at the leading edge of clock cycle 11 and detected by BIU 16. D flip-flop 84b supplies the fifth data set (D5) to input (1) of multiplexer 88 and to multiplexer 86a at the leading edge of clock cycle 12. The multiplexer 86a supplies data set (D5) to D flip-flop 86b in response to the advance signal (AD_ADV) maintained by advance signal generator 66 through the leading edge of clock cycle 12. Hence, multiplexers 84a and 86a are both supplying data set (D5) to inputs 1 and 0 of multiplexer 86, respectively.

The target deasserts the target ready (TRDY#) over PCI buys 12 at event 132 because the target is no longer ready to receive data. Advance signal generator 66 deasserts the advance signal (AD_ADV) during clock pulse 12 through the leading edge of clock cycle 13 in response to the lack of readiness of the target indicated by the deassertion of the target ready signal (TRDY#).

The target asserts and supplies the target ready signal (TRDY#) over PCI bus 12 at event 134 indicating the ability of the target to again receive data. Register 92 successfully transfers (XFR) at the leading edge of clock cycle 13 the fourth data set (D4) to the target using PCI bus 12 in response to BIU 16 detecting the target ready signal (TRDY#) at the leading edge of clock cycle 13. The transfer of the fourth data set (D4) completes the write burst transfer originally defined by (DMA_XFR_CNT) as requiring four data set transfers from SRAM 18a to the target over PCI bus (AD) 12.

In summary, a network interface is provided that has SRAM 18a that outputs ordered data to a target by using a first and second holding register 84 and 86, and an output holding register 92. The SRAM 18a supplies a data set to the first holding register 84 which supplies the first data set to the second holding register 86. The SRAM 18a also replenishes the first holding register 84 with a second data set. A multiplexer 88 selectively supplies the data set stored in one of the two holding registers 84, 86 to the output holding register 92 which supplies that data set to a bus 12 connected to the target. A bus interface unit state machine 90 supplies a select signal (SS1) to the multiplexer 88 to control the selection between the first and second holding registers 84, 86. The state machine 90 generates the select signal SS1 based on bus access controller (BIU 16) detecting the target ready signal (TRDY#) generated by the target indicating the target's readiness to receive a data set. The select signal SS1 enables the multiplexer 88 to supply the next ordered data set to the output holding register 92. If the target ready signal (TRDY#) is asserted too frequently for the first holding register 84 to replenish the second holding register 86, then the state machine 90 generates a select signal SS that controls the multiplexer 88 to supply the data set stored within the first holding register 84 to the output holding register 92. If the target ready signal (TRDY#) is asserted relatively infrequently and the first holding register 84 has sufficient time to replenish the second holding register 86, then the state machine 90 generates a select signal SS that controls the multiplexer 88 to supply the data set stored within the second holding register 86 to the output holding register 92.

The operation of the exemplary arrangement described above in general terms allows data to initially be supplied to the target more quickly than conventional systems because data is supplied to the holding registers 84, 86, and 92 from SRAM 18a sooner than conventional arrangements output data from memory. This minimizes arbitration delays and wait states typically caused in conventional systems. Additionally, when the target exhibits erratic conditions as depicted by the assertion of the target ready signal in FIG. 5, the present arrangement advantageously handles these conditions in a generic manner due in part to the flexibility of the state machine 90 in supplying the select signal to multiplexer 88 which dictates the correct supply of the next ordered data set to the output holding register 92. Conventional systems typically cannot rely on the same arrangement used to supply data when complex conditions arise, and must turn to more complicated recovery arrangements.

While this invention has been described in connection with what is presently considered to be most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface for transferring data to and from a target across a host bus, comprising:

generating a memory advance signal based on at least one of a transfer request signal generated in the network interface by a bus access controller, a grant signal on the host bus following the transfer request signal, and a ready signal on the host bus indicating a ready condition by the target to receive data;

first storing a first data set, supplied from a memory, in a first host bus clock cycle;

second storing the first data set stored in the holding register into a second holding register in response to assertion of the memory advance signal during a second host bus clock cycle following the first host bus clock cycle;

third storing a second data set in the first holding register in response to assertion of the memory advance signal during the second host bus clock cycle; and selectively supplying one of the first and second data sets to an output holding register for output on the host bus based on the memory advance signal.

2. The method of claim 1 where the selectively supplying is supplied from the first holding register based on the grant signal during the second clock cycle.

3. The method of claim 2 wherein the memory advance signal is further based on assertion of an address phase signal on the host bus following and based on the assertion of the grant signal.

4. The method of claim 3 further comprising:

fourth storing the second data set stored in the first holding register into the second holding register in response to assertion of the memory advance signal during a third clock cycle following the second clock cycle; and fifth storing a third data set, supplied from memory, in the first holding register in response to the assertion of the memory advance signal during the third clock cycle.

5. The method of claim 4 further comprising:

first outputting, in response to a first detected ready signal supplied from the target, the first data set from a third register to the target via the host bus, wherein the first detected ready signal indicates a readiness of the target to receive data transferred via the host bus; and sixth storing the second data set stored in the second holding register into the third register in response to the first outputting step.

6. The method of claim 5 further comprising:

seventh storing the third data set in the second register in response to the first outputting step at a post-output clock cycle which is after the first outputting step; and eighth storing, at the post-output clock cycle, a fourth data set in the first register in response to the first outputting step.

7. The method of claim 6 wherein the selectively supplying step is based on detecting a second ready signal following the first detected ready signal, wherein the second detected ready signal indicates the readiness of the target to receive data transferred via the host bus.

8. The method of claim 7 wherein detecting the second ready signal occurs at a next clock cycle that immediately follows the detection of the first detected ready signal such that the select signal dictates the selection of the first holding register input for output to the third register.

9. The method of claim 7 wherein detecting the second ready signal occurs at a next clock cycle which follows an intervening clock cycle that immediately follows the detection of the first detected ready signal such that the select signal dictates the selection of the second holding register input for output to the output holding register.

10. The method of claim 7 wherein the seventh and eighth storing steps occur during detection of the second ready signal.

11. A network interface for transferring received data via a host bus to a target, comprising:

a memory configured for storing a plurality of data sets;

a bus access controller for generating an advance signal based on at least one of a transfer request signal generated by the network interface, a grant signal on the host bus following the transfer request signal, and a ready signal on the host bus indicating a ready condition by the target to receive data;

a first holding register for storing a first data set transferred from the memory in response to assertion of the advance signal during a first clock cycle;

a second holding register for storing the first data set from the first register in response to assertion of the advance signal during a second clock cycle following the first clock cycle, the first register storing a second data set output from the memory in response to assertion of the advance signal during the second clock cycle; and an output holding register for selectively storing one of the first and second data sets for output on the host bus based on detection of the memory advance signal.

12. The network interface of claim 11, further comprising a multiplexer for selectively outputting one of the first and second data sets, respectively, from the first and second holding registers based on a select signal.

13. The network interface of claim 12, further comprising a bus interface unit state machine for generating the select signal during a current clock cycle based on the bus access controller detecting a successful output from the output holding register of two data sets during consecutive clock cycles.

14. The network interface of claim 11 wherein the memory is a static random access memory.

15. The network interface of claim 11, further comprising a third holding register and wherein said first, second and third holding registers each comprise a D flip-flop and a register multiplexer having an output connected to the D flip-flop.

16. The network interface of claim 11 further comprising an address register that stores an address pointing to a data set stored in the memory and an incrementer for incrementing the address stored in the address register.

17. The network interface of claim 16 flirther comprising a read line signal generator for reading to the address corresponding to one of said plurality of data sets transferred from the memory.

* * * * *